United States Patent [19]

Herman et al.

[11] Patent Number: 4,465,597
[45] Date of Patent: Aug. 14, 1984

[54] TREATMENT OF INDUSTRIAL WASTEWATERS

[75] Inventors: Stewart T. Herman, Hellertown; James B. Pfeiffer, Bethlehem; Richard T. Sewald, Sr., Bethlehem; Charles J. Sterner, Bethlehem, all of Pa.

[73] Assignee: Bethlehem Steel Corp., Bethlehem, Pa.

[21] Appl. No.: 291,439

[22] Filed: Aug. 10, 1981

[51] Int. Cl.³ .............................................. C02F 1/62
[52] U.S. Cl. ................................... 210/713; 210/714; 210/724; 210/912
[58] Field of Search .............. 210/713, 714, 724, 738, 210/912

[56] References Cited

U.S. PATENT DOCUMENTS

| | | | |
|---|---|---|---|
| 3,247,106 | 4/1966 | Sopoci | 210/714 |
| 3,259,571 | 7/1966 | Marshall et al. | 210/714 |
| 3,617,559 | 11/1971 | Cywin | 210/46 |
| 3,680,698 | 8/1972 | Liu et al. | 210/714 X |
| 3,738,932 | 6/1973 | Kostenbader | 210/48 |
| 3,931,007 | 1/1976 | Sugano et al. | 210/50 |
| 4,025,430 | 5/1977 | Pagel | 210/912 X |
| 4,169,053 | 9/1979 | Sakakibara et al. | 210/49 |
| 4,186,088 | 1/1980 | Fitch et al. | 210/713 X |

Primary Examiner—Thomas G. Wyse
Attorney, Agent, or Firm—John I. Iverson; William B. Noll

[57] ABSTRACT

An industrial wastewater treatment method is described whereby heavy metals dissolved in the wastewater are precipitated as a slurry which, when allowed to settle, will form a sludge containing at least 10 weight percent solids. In the method, an aqueous suspension or solution of a neutralizing agent is introduced into a first reactor. A suspension containing particles of carrier agent is also introduced into the first reactor. A portion, if not all, of the neutralizing agent is adsorbed on the surface of the particles of the carrier, which are maintained in suspension in the first reactor. The carrier, with its adsorbed neutralizing agent, is passed to a second reactor and simultaneously the contaminated industrial wastewater is added to the second reactor. The pH of the wastewater is adjusted to a range between 8.4 and 10.6 by the neutralizing agent. Within such pH range, a substantial portion, if not all, of the heavy metals are precipitated in the form of a slurry. The mixture in the second reactor is passed to a solids separation device. The solids in the slurry settle to the bottom of the device to form a sludge which is removed therefrom. Purified water is removed as an overflow from the separation device. Optionally, a flocculant may be added to aid in settling the solids.

Insoluble calcium salts may also be precipitated in the second reactor. Such insoluble salts are adsorbed on the surface of the carrier and/or the heavy metal slurry particles and become part of the sludge formed in the separation device.

11 Claims, 2 Drawing Figures

TREATMENT OF INDUSTRIAL WASTEWATERS

BACKGROUND OF THE INVENTION

This invention is directed to an industrial wastewater treatment method wherein a neutralizing agent is adsorbed on the surfaces of a carrier and the carrier-neutralizing agent combination is added to the wastewater to adjust the pH of the wastewater to a desired range whereby a substantial portion of heavy metals dissolved in the wastewater is precipitated to form a slurry which if allowed to settle will form a sludge containing a relatively high percentage of solids. The sludge is easily separated from the water. In the event that insoluble calcium salts are also precipitated, such salts are precipitated on the surfaces of the particles of solids in the slurry. Wastewater so treated is purified sufficiently to allow its reuse in industrial processes or discharge to the environment, for example into surface waters.

The discharge of industrial wastewater containing dissolved concentrations of heavy metals, for example iron, manganese, copper, tin, lead, nickel, mercury, zinc, cadmium, and the like to the environment is frequently prohibited because such heavy metals may be toxic to aquatic life and may also render the surface waters unfit for human consumption. Reuse of such contaminated wastewater in industrial processes is also limited because, as the concentration of heavy metals increases during reuse, such concentrations may become sufficient to poison the processes in which they are reused. It is therefore frequently desirable for wastewater be treated to either remove substantially all heavy metals or to reduce the amounts of the dissolved heavy metals to levels at which the water is considered safe for both aquatic and human life prior to disposal in surface waters and which are considered to be satisfactory for reuse in industrial processes.

Many processes for the removal of dissolved heavy metals from industrial wastewater have been proposed. Several processes advocate the addition of iron and alkali metal or alkaline earth metal hydroxides to the wastewater to adjust the pH of the wastewater whereby the heavy metals will be precipitated from the wastewater. Generally a pH within a range between about 8 and 11 is used. The mixture thus formed is heated to a temperature between 40° and 100° C. so that the heavy metals will precipitate. An aerating environment may also be required to precipitate the heavy metals as ferrites. Since the solubility of the various heavy metals varies with the pH of the solution in which they are dissolved, a portion of the heavy metals which are precipitated at pH levels which are relatively neutral, or about pH 8, generally will be resolved when more basic pH levels, i.e. pH 9 to 12, are achieved to precipitate other heavy metals. As a result, the wastewater frequently becomes recontaminated with the heavy metals which are resolved. To treat a wastewater which contains a wide range of heavy metals, it is first necessary to adjust the pH level of the wastewater to 8 to 9 to precipitate at least some of the heavy metals. To prevent resolvation of the precipitated heavy metals, it is then necessary to separate the precipitated solids by some method, such as filtration, prior to again adjusting the pH level of the water to remove more of the dissolved heavy metals. The pH adjustment process must be repeated at various pH levels to be successful in the removal of a sufficient amount of the heavy metals to attain the desired low levels. Such a multistep or multistage process is time consuming and requires extra equipment for transport and means for removing the thin, gelatinous-like precipitated solids, and retreating the wastewater. As a result, such multistep processes are expensive. The settled precipitates produced in the processes are low in solids content, generally between 0.5 to 1 weight percent solids and occasionally only as much as 5 weight percent solids. The gelatinous-like precipitates are difficult to separate from the water. Separation requires large expensive thickeners, flocculators, filters and the like to separate the gelatinous-like solids from the water. None of the processes described above, furthermore, address the problem caused by the formation of insoluble calcium salts. A portion of the precipitated calcium salts are not removed with the precipitated heavy meatals, but are deposited on the surfaces of the equipment and piping used to treat or transport the wastewater. Layers of the salts accumulate and eventually clog the equipment. It is therefore necessary to periodically shut down the equipment and remove the deposited salts thereby adding to the costs of the process.

Other processes used to treat acidic industrial wastewater, for example acid mine drainage, waste pickle liquor and the like which contain ferrous and/or ferric ions, require the use of a neutralizing agent, for example limestone, to neutralize the acidity of the water and to adjust the pH of the wastewater from between about 2 and 5 to about 7.0 and 8.4. In at least one of these processes sludge relatively high in solids content is produced. The process requires that a specified amount of sludge containing a specified amount of solids must be recycled in the process to precipitate a sufficient quantity of solids to maintain the solids content of the sludge. In the processes a large portion of iron and a small portion of some heavy metals, for example, manganese or zinc, are precipitated and removed at a pH of about 8 to 8.6. However, the processes do not at one time solve the problem of removal of all the toxic heavy metals within a pH range of 8.4 to 10.6. Nor do these processes address the problems associated with the precipitation of insoluble calcium salts which often occurs when a calcerous material is used as a neutralizing agent.

None of the prior art processes mentioned above solve the problem of removing heavy metals from wastewaters by mixing a neutralizing agent adsorbed on a carrier with industrial wastewater containing dissolved heavy metals to effectively adjust the pH of the wastewater to a desired range whereby a substantial portion of the heavy metals dissolved in the wastewater will be reduced to acceptably low levels by precipitating them in the form of a slurry which when allowed to settle will form a high solids sludge.

It is the object of this invention to provide an industrial wastewater treatment method to remove dissolved heavy metals from wastewater wherein the wastewater is mixed with a neutralizing agent adsorbed on the surfaces of a carrier to adjust the pH of the wastewater to a desired pH range at which a substantial portion, if not all, of the dissolved heavy metals is precipitated as a slurry which, if allowed to settle, will form a sludge containing a high percentage of solids with little if any resolvation of the heavy metals.

It is another object of this invention to provide an industrial wastewater treatment method in which a portion of the sludge formed in the method is recycled in the system.

It is also an object of this invention to provide an industrial wastewater treatment method in which a flocculant is added to the treated wastewaters to aid in settling the slurry formed during the neutralizing step.

It is a further object of this invention to provide an industrial wastewater treatment method in which insoluble calcium salts are precipitated on the slurry solids of heavy metals and the calcium salts are separated from the water as part of the sludge.

SUMMARY OF THE INVENTION

According to this invention, there is provided an industrial wastewater treatment method wherein a substantial portion, if not all, of the heavy metals dissolved in the wastewater is precipitated and separated from the water as a slurry which, if allowed to settle, will form a sludge characterized by a solids content of at least 10 weight percent. The quantity of heavy metals remaining dissolved in the wastewater is reduced to a level which satisfies environmental discharge criteria. If any insoluble calcium salts are precipitated, they are precipitated on the surfaces of the solids in the slurry and are removed from the water with the settled slurry solids.

In the method, an aqueous suspension or solution of a neutralizing agent, for example alkali metal or alkaline earth metal compounds, for example sodium hydroxide or lime, is added to a first reactor in the presence of a carrier. The agent is substantially instantaneously adsorbed on the surfaces of particles of the carrier, which may be silica, sand, oxides of the heavy metals or the like. The carrier agent suspension and the wastewater are simultaneously charged into a second reactor. The neutralizing agent adjusts the pH of the wastewater from between about 2.5 and 5 to a range between 8.4 and 10.6. A substantial portion, if not all, of the heavy metals dissolved in the wastewater are precipitated in the form of a slurry which, if allowed to settle, will form a sludge which contains at least 10 weight percent solids. The mixture of carrier-agent precipitated metals and water formed in the second reactor is introduced to a solids separation device, such as a thickener. The slurry is allowed to settle to the bottom and is removed from the thickener. Purified water, which may contain acceptably low levels of dissolved heavy metals, is removed as the overflow from the separation device. Any insoluble calcium salts, which may form, are precipitated on the surfaces of the solids in the slurry and form a part of those solids which are separated from the water as sludge.

If the wastewater contains sufficiently high levels of dissolved anions and cations to form a settleable slurry, a portion of sludge formed by settling the slurry can be recycled from the thickener to the first reactor and can be used as the carrier to adsorb the neutralizing agent. The recycled sludge, which contains heavy metal oxides, may contain some unused neutralizing agent, therefore it also acts like a buffer in the second reactor.

If desired, a flocculant may be added to the slurry in a third vessel or flocculator or in the thickener to aid in settling the solids in the slurry.

FIGURES OF THE INVENTION

PREFERRED EMBODIMENT OF THE INVENTION

In the preferred embodiment of this invention, there is provided an industrial wastewater treatment method whereby heavy metals dissolved in the industrial wastewater will be precipitated as an aqueous slurry which, if allowed to settle, will form a sludge containing a relatively high percentage of solids which can be easily separated from the water. The purified wastewater may contain limited amounts of dissolved heavy metals, but such amounts are sufficiently low to be considered nontoxic to aquatic life, not dangerous to human life nor poisonous to industrial processes. The water may be recycled in the industrial process or may be discharged to surface waters without the danger of polluting such waters. In the method, the wastewater is mixed for a time with a neutralizing agent adsorbed on the surfaces of a carrier whereby the pH of the wastewater is adjusted to a desired range at which a substantial portion, if not all, of the heavy metals will be precipitated in the form of an aqueous slurry of solid particles which, if allowed to settle, will form a sludge which is characterized by a solids content of at least 10 weight percent. Resolution of the heavy metals in the wastewater, if not completely eliminated, is reduced to a minimum.

In these specifications a slurry is defined as a thin watery mixture containing precipitated solids. A sludge is defined as thickened solid matter containing at least 10 weight percent solids and is formed by storing a slurry for a period of time to allow the precipitated solids to settle out of the slurry.

Industrial wastewater which may contain one or more heavy metal cations in solution, for example iron, manganese, copper, nickel, tin, zinc, lead, cadmium, mercury, selenium and balancing anions, for example sulfates, carbonates and fluorides, can be treated by the method of the invention. If the wastewater contains arsenic, the arsenic can be precipitated in the presence of soluble iron or lead.

Figure 1:
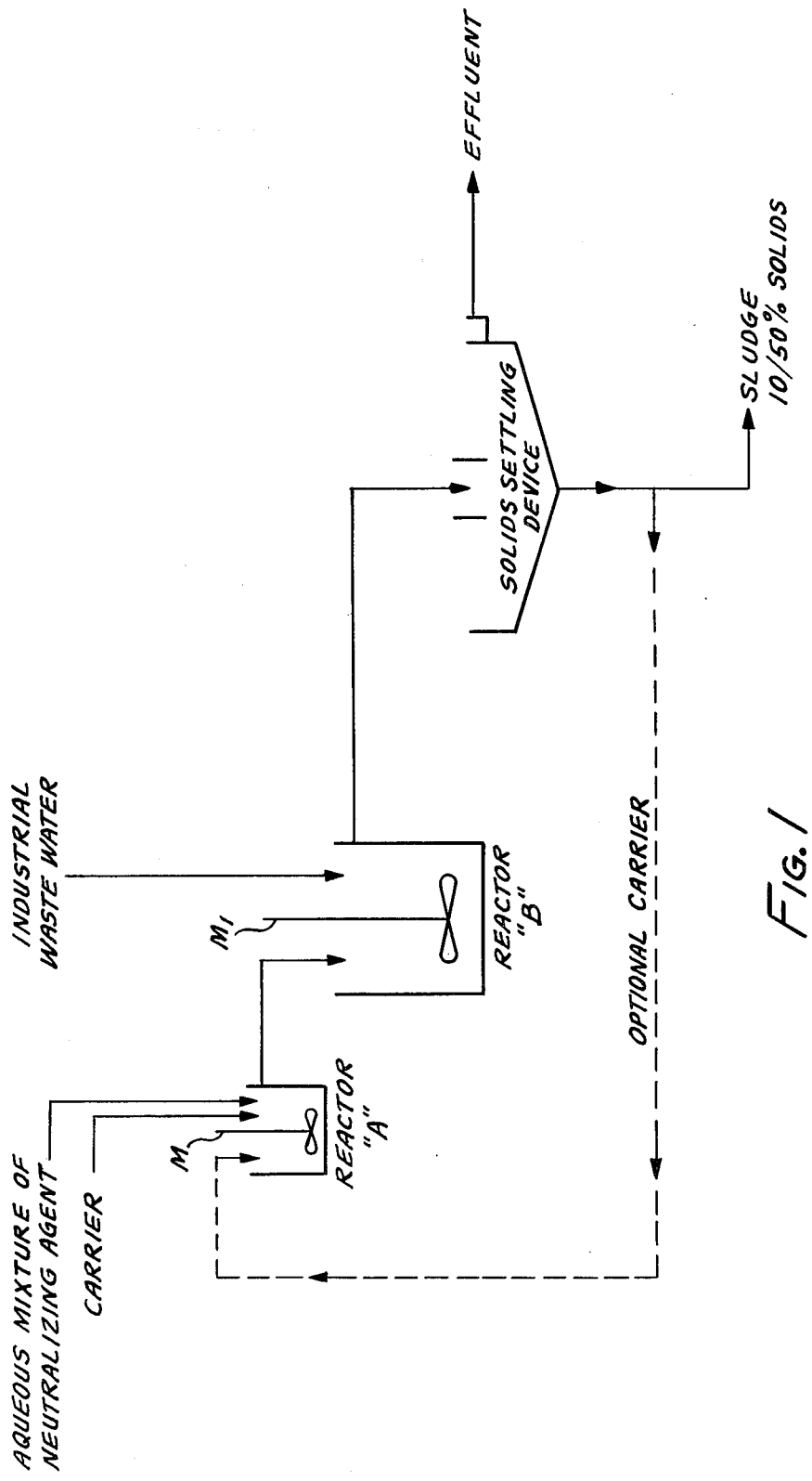
FIG. 1 is a flowsheet in schematic showing the method of the invention.
Figure 2:
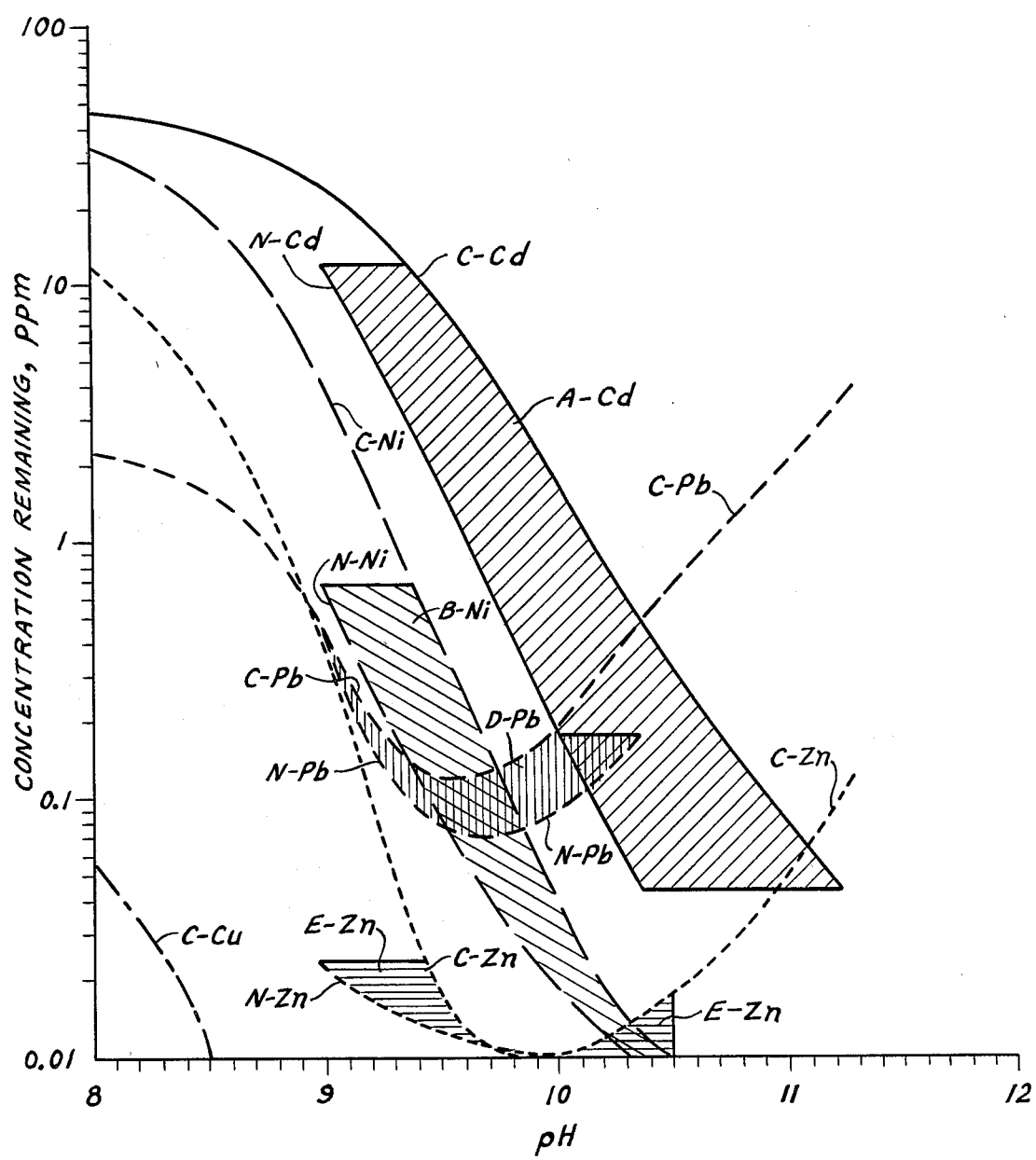
FIG. 2 is a graph showing the comparison of heavy metal removal by the method of the invention and a prior art neutralization method.

Turning now to FIG. 1, a suspension consisting of particles of a carrier and water and a suspension or aqueous solution of a neutralizing agent are charged into a first reactor (reactor "A"). A stirrer M is provided in the reactor to mix the suspensions. A substantial portion, if not all, of the neutralizing agent is substantially instantaneously adsorbed on the surfaces of the particles of the carrier. Since the adsorption is substantially instantaneous, the detention time in the first reactor can be very short, for example one or two minutes. The neutralizing agent may be an alkali or alkaline earth metals compound, for example sodium hydroxide, potassium hydroxide, sodium carbonate, limestone, dolomitic lime, lime, calcium carbonate, and the like. The carrier can be particles of sand, silica, alumina, heavy metal oxides, recycled sludge formed in the method and the like. The carrier and adsorbed neutralizing agent and the wastewater are charged substantially simultaneously into a second reactor (reactor "B"). Sufficient neutralizing agent from the first reactor is added to the second reactor to adjust the pH of the wastewater in the second reactor from between about 2.5 and 5.0 to within a range between about 8.4 and 10.6. The neutralizing agent can have a particle size small enough, for example less than about $\frac{1}{8}$ inch, so that it will be dispersed and partially or wholly dissolved. The carrier can have a particle size within the range, for example 100 percent minus 28 mesh down to 100 percent minus 325 mesh. The carrier should have a surface area sufficiently large to adsorb a substantial portion, if not all, of the neutralizing agent required to adjust the pH of the wastewater to the desired level. Within the pH range noted above, a substantial portion, if not all, of the heavy metals will be precipitated as oxides/hydroxides. Additionally, if any soluble salts dissolved in the wastewater are precipitated as insoluble calcium compounds when a calcium containing compound is used as the neutralizing agent, they will be precipitated as part of the sludge, i.e. they will be precipitated on the surfaces of the particles contained in the slurry or sludge. The time of residence of the wastewater and neutralizing agent in the second reactor must be of sufficient duration to precipitate substantially all of the heavy metals and any insoluble salts. As little as one minute residence time may be used; however, it is preferred to use a residence time of about three minutes, and more preferred ten minutes, in the second reactor. As seen in FIG. 2, means M' are provided in the second reactor to mix the wastewater solution and neutralizing agent carrier suspension.

The slurry in the second reactor flows to a solids separating device, for example a thickener. The slurry remains in the device for a time, for example about 4.0 hours, to allow the solids to settle to the bottom of the thickener and form sludge which contains at least 10 weight percent solids and may contain as much as 50 weight percent solids. The sludge is removed from the thickener through ports in the bottom. The substantially solids-free, purified water is removed as overflow from the top of the thickener. The purified water may contain inconsequential amounts of dissolved heavy metals and may be recycled to the plant or may be discharged to the environment. It is postulated that the reactions, whereby the heavy metals and calcium salts are precipitated in the second reactor, occur on or very close to the surfaces of the carrier-neutralizing agent, for example within 0.01 mm or less distance from the surfaces. At these distances the pH of the solution may be within a range of 9.0 to 12.0. At distances further from the surfaces of the carrier the pH of the solution becomes less basic but remains basic and may be between 8.4 to 10.6.

If ferric iron is present in the industrial wastewater it will be precipitated within a pH range of about 3.5 to 5.0. Therefore, if a dense sludge is to be obtained, acidic wastewater which contains ferric iron must be treated by adjusting the pH to between 3.5 and 5.0 to precipitate a major portion of the ferric iron. Substantially all ferrous iron is oxidized and precipitated at a pH range of 7 to 8.4. Substantially all of the ferrous iron can be removed at a pH of 9.0 without oxidation. The slurry formed during neutralization of industrial wastewater containing high levels of dissolved iron is high in solids content and can be recycled in the process because the solids will act as a carrier for the neutralizing agent. Apparently not all of the neutralizing agent is used during the initial stages of neutralization in the second reactor. As a result, when the sludge is recycled a portion of neutralizing agent which is unreacted is also recycled and acts like a buffering agent to prevent changes in pH in the second reactor.

Iron in the wastewater encourages the precipitation of the other heavy metals. Generally, a portion of dissolved heavy metals begins to precipitate at a pH of 9. In the presence of iron the precipitation is initiated at a pH of 8 to 8.4. Since the pH of the treated wastewater is about 8.4 to 10.6, less and sometimes no acidic materials must be added to the treated wastewater to bring the pH level back to acceptable discharge levels, generally pH 6.0 to 8.5, prior to discharging the water into surface waters to meet the requirements of federal and state standards regulating the condition of water discharged into surface waters.

While the exact mechanism of the precipitation method is not known, it is postulated that the heavy metals are precipitated as part of the crystal lattice on the surfaces of the carrier-neutralizing agent and that as precipitation continues superimposed layers of the heavy metals continue to be deposited on the carrier-neutralizing agent. This is also true in the case of insoluble calcium salts.

FIG. 2 is a graph showing the comparison of a commercially practiced prior art neutralization process and the neutralization method of the invention. The graph shows the effects of pH levels on the precipitation of heavy metals in both processes. The curves representing the use of a commercially used neutralization process are identified by a "C" and those curves representative of the method of the invention are identified with an "N". A wastewater having a pH of 2.4 and containing about 50 ppm (by ppm we mean parts per million except where otherwise stated) each of the heavy metals copper, cadmium, nickel, lead and zinc was charged into the second reactor where it mixed with a slurry containing particles of recycled sludge as the carrier and calcium hydroxide as the adsorbed neutralizing agent. The alkaline mixture was used to adjust the pH of the wastewater successively to 9, 9.5, 10, and 10.5. Between each adjustment samples of the water and the sludge formed by allowing the slurry to stand for about thirty minutes were taken and analyzed. At a pH of 9, the wastewater was found to have a copper content essentially 0, i.e. below detectable limits, a cadmium content (N-Cd) of about 12 ppm, a nickel content (N-Ni) of about 0.7 ppm, a zinc content (N-Zn) of about 0.022 ppm and a lead content (N-Pb) of about 0.4 ppm. At a pH of 9.5, the heavy metals content dropped as shown in the graph. At a pH of 10.1 a portion of lead which had precipitated at a pH of 9.5 was redissolved in the solution. The cadmium content was reduced to about 0.13 ppm and the nickel and zinc contents were reduced to less than 0.01 ppm. At a pH of 10.4 the cadmium content was reduced to 0.04 ppm but another small portion of lead was redissolved and the lead content increased to 0.18 ppm.

The improvement in the removal of heavy metals at lower pH levels from industrial wastewaters, containing such heavy metals, by the neutralization method of the invention compared to a neutralization method now in commercial use, is shown by the cross-hatched areas A-Cd, B-Ni, D-Pb and E-Zn in the graph, FIG. 2.

In contrast, the prior art neutralization process used a calcium hydroxide slurry as the neutralization agent to adjust the pH of the same solution without the use of a carrier. The pH of the solution was adjusted to the same levels as cited in the above process. At a pH of 8, the copper content (C-Cu) was reduced to about 0.043 ppm, the cadmium content (C-Cd) to 46 ppm, the nickel content (C-Ni) to 33 ppm, the lead content (C-Pb) to 2.2 ppm, and the zinc content (C-Zn) to 13 ppm. At a pH of 9.5, the copper content was reduced to less than 0.01 ppm, the cadmium content to 9 ppm, the nickel content to 0.43 ppm, the lead content to 0.14 ppm and the zinc content to 0.018 ppm. At a pH of 10, the cadmium content was reduced to 1.7 ppm, the nickel content to 0.044 ppm, a portion of the lead resolved in the solution increasing the content to 0.20 ppm and the zinc content was less than 0.01 ppm. Adjusting the pH of the solution to 10.4 resulted in an additional resolution of lead increasing the content to 0.53 ppm, a resolution of a portion of the zinc increasing the content to 0.015 ppm and a decrease of cadmium content to 0.45 ppm. At a pH of 11.25 the cadmium content was reduced to 0.05 ppm, which content was higher than the cadmium content of the solution at a pH of 10.4 treated by the method of the invention. Similarly, the lead content increased to 3.5 ppm and the zinc content to 0.095 ppm.

When the wastewater contains sufficient concentration of soluble heavy metals, carbonate, sulfate or fluoride ions, a portion of the sludge formed during the start of the method can be recycled to the first reactor and acts as a carrier for the neutralizing agent. In this case, it is not necessary to add any other material as a carrier. Ferric and ferrous ions which may be present are reduced to contents below the required limits at a pH within the range of 4.0 and 8.2. As noted previously, the ferrous and/or ferric ions act as a co-precipitate to allow the removal of heavy metals at a lower pH than normally used.

As postulated previously, the calcium salts, particularly the sulfates, are removed from the wastewater by being precipitated on the surfaces of the solids in the slurry. As a result, when the solids settle to form the sludge, these calcium salts also settle and are removed from the wastewaters with the sludge. In conventional processes, such calcium salts typically are deposited in layers on the surfaces of the equipment, for example, thickener, pumps and pipes used to hold and transport the solutions which contain the salts. Such layered deposits are extremely difficult to remove and necessitate the closedown of the system for their removal.

The method of the invention is more effective than a standard neutralization process in removing manganese from wastewater. An acid mine drainage (AMD) wastewater which contains 30 ppm iron, 13 ppm manganese and 150 ppm carbonate and having a pH of 6.4 was treated by the method of the invention and by a standard neutralization method. The flowrate of the AMD wastewater was 300 cc per min. Sludge containing about 25 weight percent solids generated by the process was recycled in the system to act as a carrier for the neutralizing agent. A 0.3 weight percent aqueous lime slurry was mixed with the recycled sludge in the first reactor. The mixture was added to the AMD in the second reactor. At a pH of 7.8, the effluent contained about 7.5 ppm manganese. At a pH of 8.4 the manganese content of the AMD dropped to 2.5 ppm and at a pH of 9 the effluent contained less than 0.1 ppm iron, less than 1.0 ppm manganese and less than 20 ppm carbonate.

By contrast, the same AMD treated by a standard neutralization process required a pH of 10.0 to achieve the equivalent heavy metals and carbonate removal.

Dissolved manganese is readily precipitated from wastewater in the absence of iron by the method of the invention wherein sludge formed in the process is recycled and used as the carrier for the neutralizing agent. For example, a 0.5 weight percent aqueous suspension of lime was mixed with recycled sludge in the first reactor. The sludge-lime suspension and wastewater, which was devoid of iron but did contain 50 ppm of dissolved manganese, were charged into a second reactor. Sufficient neutralizing agent was added to the first reactor to adjust the pH of the suspension in the second reactor to 8.8. The mixture was stirred and after a period of eight minutes, samples of the discharge from the second reactor were tested and found to have a soluble manganese content of less than 0.1 ppm.

In a similar test using standard neutralization techniques, a 2.0 percent lime slurry was added directly to the manganese bearing wastewater without being adsorbed on a carrier. The pH of the wastewater was raised incrementally and samples of the neutralized wastewater were taken at each pH increment. The soluble manganese was reduced to 43 ppm at a pH of 8.8 and to less than 0.1 ppm at a pH of 10.0.

In a specific example, an acid wastewater having a pH of 2.4 and containing 50 each ppm of manganese, copper, cadmium, nickel, zinc and 2200 ppm of sulfate, and 17 ppm of fluoride was treated by the method of the invention.

$Ca(OH)_2$, having a maximum particle size of 100 mesh, was added to water to form a 0.5 percent weight per volume lime suspension. Sand having a maximum particle size of 100 mesh was added to water to form a 20 weight percent suspension. The two suspensions were pumped simultaneously into the first reactor, resulting in feed rates of 0.04 grams per minute of $Ca(OH)_2$ and 5.0 grams per minute of sand. The aqueous lime/sand suspension formed in the first reactor and the acidic wastewater were charged into the second reactor. The mixture in the second reactor had a pH of 10.2 and was allowed to remain in the second reactor for eight minutes. The aqueous slurry containing about 5.2 weight percent solids, flowed to a thickener. The solids in the slurry settled to the bottom of the thickener forming a sludge containing 68 weight percent solids. Samples of the sludge were analyzed and found to be sand coated with a thin layer of sludge which contained 10 weight percent manganese, 10 weight percent copper, 10 weight percent cadmium, 10 weight percent nickel and 10 weight percent zinc.

We claim:

1. An improved method for treating acidic wastewater which contains a quantity of dissolved heavy metals exceeding the level of environmental discharge criteria and having a pH between about 2.5 and 5.0 whereby such quantity of dissolved heavy metals is reduced to a level below environmental discharge criteria and the resolvation of the heavy metals in the acidic wastewater is reduced to a minimum, comprising:

(a) mixing particles of at least one carrier agent taken from the group consisting of sludge formed in the method, silica, sand and alumina and an aqueous mixture of at least one neutralizing agent taken from the group consisting of sodium hydroxide, potassium hydroxide, calcium carbonate, sodium carbonate, limestone, calcium oxide and dolomitic limestone in a first reactor for a time sufficient to allow the neutralizing agent to be adsorbed on the particles of the carrier agent and to form an aqueous suspension of the carrier-neutralizing agents, (b) charging the acidic wastewater and a sufficient amount of the aqueous suspension of the carrier-neutralizing agents formed in step (a) into a second reactor wherein the pH of the acidic wastewater is adjusted to between about 8.4 and 10.6, (c) mixing the acidic wastewater and the aqueous suspension of the carrier-neutralizing agents formed in step (a) in the second reactor for a time to precipitate a portion of the heavy metals as oxides and/or hydroxides which are precipitated on the surfaces of the carrier-neutralizing agents and the quantity of heavy metals dissolved in the wastewater is reduced to below environmental discharge criteria, (d) passing the aqueous mixture formed in step (c) to a thickener, (e) allowing the aqueous mixture to remain in the thickener for a time sufficient to allow the carrier-neutralizing agents coated with the precipitated oxides and/or hydroxides to settle to the bottom of the thickener whereby a sludge containing at least 10 weight percent solids is formed, (f) removing the sludge from the bottom of the thickener, and (g) flowing water containing a quantity of dissolved heavy metals which is below environmental discharge criteria over the top of the thickener.

2. The improved method for treating acidic wastewater of claim 1 wherein the acidic wastewater to be treated also contains dissolved salts which are precipitated as insoluble calcium compounds.

3. The improved method for treating acidic wastewater according to any one of claims 1 and 2 wherein the carrier is sand.

4. The improved method for treating acidic wastewater according to any one of claims 1 and 2 wherein the carrier is sludge.

5. The improved method for treating acidic wastewater according to any one of claims 1 and 2 wherein the neutralizing agent is an aqueous suspension of calcium hydroxide.

6. The improved method for treating acidic wastewater according to any one of claims 1 and 2 wherein the neutralizing agent is an aqueous suspension of calcium carbonate.

7. The improved method for treating acidic wastewater of claim 1 wherein the neutralizing agent is an aqueous solution of sodium hydroxide.

8. The improved method for treating acidic wastewater of claim 2 wherein the precipitated calcium salts are removed from the water with the heavy metals.

9. The improved method for treating acidic wastewater according to any one of claims 1 and 2 wherein the aqueous suspension of the carrier-neutralizing agents formed in step (a) and the acidic wastewater remain in the second reactor for at least one minute in step (c).

10. The improved method for treating acidic wastewater according to any one of claims 1 and 2 wherein the sludge formd in step (e) contains between 10 and 50 weight percent solids.

11. The improved method for treating acidic wastewater according to any one of claim 1 and 2 wherein a flocculant is added to the slurry in step (e).

* * * * *

REEXAMINATION CERTIFICATE (2548th)

United States Patent [19]
Herman et al.

[11] B1 4,465,597
[45] Certificate Issued Apr. 25, 1995

[54] TREATMENT OF INDUSTRIAL WASTEWATERS

[75] Inventors: Stewart T. Herman, Hellertown; James B. Pfeiffer, Bethlehem; Richard T. Sewald, Sr., Bethlehem; Charles J. Sterner, Bethlehem, all of Pa.

[73] Assignee: Tetra Technologies, Inc., The Woodlands, Tex.

Reexamination Request:
No. 90/002,660, Feb. 25, 1992

Reexamination Certificate for:
Patent No.: 4,465,597
Issued: Aug. 14, 1984
Appl. No.: 291,439
Filed: Aug. 10, 1981

[51] Int. Cl.[6] .......................................... C02F 1/62
[52] U.S. Cl. .................................. 210/713; 210/714; 210/724; 210/912
[58] Field of Search ............... 210/713, 714, 724, 738, 210/912

[56] References Cited

U.S. PATENT DOCUMENTS

| | | | |
|---|---|---|---|
| 2,810,633 | 10/1957 | Cooper | 75/5 |
| 3,089,789 | 5/1963 | Van Note | 127/50 |
| 3,247,106 | 4/1966 | Sopoci | 210/714 |
| 3,259,571 | 7/1966 | Marshall et al. | 210/714 |
| 3,284,350 | 11/1966 | Williamson | 210/46 |
| 3,419,493 | 12/1968 | Pangle, Jr. | 210/44 |
| 3,575,854 | 4/1971 | Richards | 210/50 |
| 3,579,443 | 5/1971 | Horst | 210/49 |
| 3,617,559 | 11/1971 | Cywin | 210/46 |
| 3,680,698 | 8/1972 | Liu et al. | 210/714 |
| 3,738,932 | 6/1973 | Kostenbader | 210/48 |
| 3,847,807 | 11/1974 | Herman et al. | 210/46 |
| 3,931,007 | 1/1976 | Sugano et al. | 210/50 |
| 3,966,600 | 6/1976 | Crowley et al. | 210/46 |
| 4,025,430 | 5/1977 | Pagel | 210/912 |
| 4,093,543 | 6/1978 | Rodewald et al. | 210/59 |
| 4,169,053 | 9/1979 | Sakakibara et al. | 210/49 |
| 4,186,088 | 1/1980 | Fitch et al. | 210/713 |

FOREIGN PATENT DOCUMENTS

| | | | |
|---|---|---|---|
| 2120550 | 8/1972 | France | |
| 1196137 | 7/1965 | Germany | |
| 2340326 | 2/1975 | Germany | |
| 55-19643 | 5/1980 | Japan | B01D 21/00 |
| 793528 | 7/1979 | South Africa | |
| 1535024 | 12/1978 | United Kingdom | |

OTHER PUBLICATIONS

Kostenbader et al. Third Symposium Coal Mine Drainage Pittsburgh, Pa., May 19–20, 1970.
Gauthier—Canadian Mining Journal, Mar., 1980.
Typliski et al—Canadian Mining Journal, Mar., 1980.
Kuit I—Canadian Mining Journal, Mar., 1980.
Kuit II—CIM Bulletin, Dec., 1980.
Reinhold Publishing Corporation—The Condensed Chemical Dictionary, 1956, pp. 409, 651, 652.
Article entitled "Dewatering of Mine Drainage Sludge" by Coal Research Bureau, West Virginia University, for the Environmental Protection Project 14010 FJX, Dec. 1971, pp. 26–32.
Article entitled "Cementation Plant Reduces Chromium, Recovers Copper" by Thomas L. Jester and Thomas H. Taylor, Industrial Wastes, Mar./Apr. 1975, pp. 26–28.
Article entitled "Industrial Waste Treatment System Reduces Pollution" by Robert John Klancko, et al., Industrial Wastes, Jan./Feb. 1976, pp. 27–29.
Excerpt from book entitled "Principles of Industrial Waste Treatment" by Charles F. Gurnham, pp. 177–186, pub. 1955 by Wiley, New York.

*Primary Examiner*—Thomas S. Wyse

[57] ABSTRACT

An industrial wastewater treatment method is described whereby heavy metals dissolved in the wastewater are precipitated as a slurry which, when allowed to settle, will form a sludge containing at least 10 weight percent solids. In the method, an aqueous suspension or solution of a neutralizing agent is introduced into a first reactor. A suspension containing particles of carrier agent is also introduced into the first reactor. A portion, if not all, of the neutralizing agent is adsorbed on the surface of the

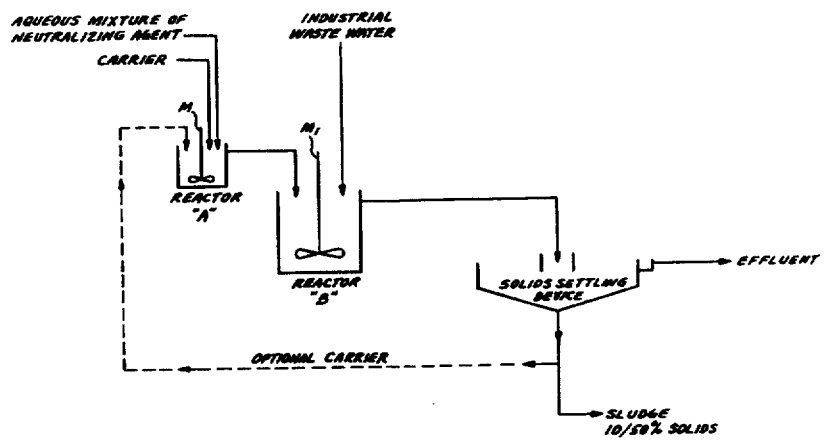

particles of the carrier, which are maintained in suspension in the first reactor. The carrier, with its adsorbed neutralizing agent, is passed to a second reactor and simultaneously the contaminated industrial wastewater is added to the second reactor. The pH of the wastewater is adjusted to a range between 8.4 and 10.6 by the neutralizing agent. Within such pH range, a substantial portion, if not all, of the heavy metals are precipitated in the form of a slurry. The mixture in the second reactor is passed to a solids separation device. The solids in the slurry settle to the bottom of the device to form a sludge which is removed therefrom. Purified water is removed as an overflow from the separation device. Optionally, a flocculant may be added to aid in settling the solids.

Insoluble calcium salts may also be precipitated in the second reactor. Such insoluble salts are adsorbed on the surface of the carrier and/or the heavy metal slurry particles and become part of the sludge formed in the separation device.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claims 1 and 11 are determined to be patentable as amended.

Claims 2 and 4–10, dependent on an amended claim, are determined to be patentable.

New claims 12–27 are added and determined to be patentable.

1. An improved method for treating acidic wastewater which contains a quantity of dissolved heavy metals *taken from the group consisting of copper, nickel, tin, lead, cadmium, mercury, selenium and arsenic, said arsenic being in the presence of soluble iron or lead, such quantity* exceeding the level of environmental discharge criteria and having a pH between about 2.5 and 5.0 whereby such quantity of dissolved heavy metals is reduced to a level below environmental discharge criteria and the resolution of the heavy metals in the acidic wastewater is reduced to a minimum, comprising:
  (a) mixing particles of at least one carrier agent taken from the group consisting of sludge formed in the method, silica, sand and alumina and an aqueous mixture of at least one neutralizing agent taken from the group consisting of sodium hydroxide, potassium hydroxide, calcium carbonate, sodium carbonate, limestone, calcium oxide and dolomitic limestone in a first reactor for a time sufficient to allow the neutralizing agent to be adsorbed on the particles of the carrier agent and to form an aqueous suspension of the carrier-neutralizing agents,
  (b) charging the acidic wastewater and a sufficient amount of the aqueous suspension of the carrier-neutralizing agents formed in step (a) into a second reactor wherein the pH of the acidic wastewater is adjusted to between about 8.4 and 10.6,
  (c) mixing the acidic wastewater and the aqueous suspension of the carrier-neutralizing agents formed in step (a) in the second reactor for a time to precipitate a portion of the heavy metals as oxides and/or hydroxides which are precipitated on the surfaces of the carrier-neutralizing agents and the quantity of heavy metals dissolved in the wastewater is reduced to below environmental discharge criteria,
  (d) passing the aqueous mixture formed in step (c) to a thickener,
  (e) allowing the aqueous mixture to remain in the thickener for a time sufficient to allow the carrier-neutralizing agents coated with the precipitated oxides and/or hydroxides to settle to the bottom of the thickener whereby a sludge containing at least 10 weight percent solids is formed,
  (f) removing the sludge from the bottom of the thickener, and
  (g) flowing water containing a quantity of dissolved heavy metals which is below environmental discharge criteria over the top of the thickener.

11. The improved method for treating acidic wastewater according to any one of claims 1 and 2, wherein a flocculent is added to the [slurry] *aqueous mixture* in step (e).

*12. The improved method for treating acidic wastewater of claim 1 wherein the time to precipitate a portion of the heavy metals as oxides and/or hydroxides is between 1 to 10 minutes.*

*13. An improved method of treating acidic wastewater which contains a quantity of dissolved heavy metals taken from the group consisting of copper, nickel, tin, lead, cadmium, mercury, selenium and arsenic, said arsenic being in the presence of soluble iron or lead, such quantity exceeding the level of environmental discharge criteria and having a pH between about 2.5 and 5.0 whereby such quantity of dissolved heavy metals is reduced to a level below environmental discharge criteria and the resolvation of the heavy metals in the acidic wastewater is reduced to a minimum, comprising:*
  *(a) mixing particles of at least one carrier agent taken from the group consisting of sludge formed in the method, silica, sand and alumina and an aqueous mixture of at least one neutralizing agent taken from the group consisting of sodium hydroxide, potassium hydroxide, calcium carbonate, sodium carbonate, limestone, calcium oxide and dolomitic limestone in a first reactor for a time sufficient to allow the neutralizing agent to be adsorbed on the particles of the carrier agent and to form an aqueous suspension of the carrier-neutralizing agents,*
  *(b) charging the acidic wastewater and a sufficient amount of the aqueous suspension of the carrier-neutralizing agents formed in step (a) into a second reactor wherein the pH of the acidic wastewater is adjusted to between 9.0 and 10.6,*
  *(c) mixing the acidic wastewater and the aqueous suspension of the carrier-neutralizing agents formed in step (a) in the second reactor for a time to precipitate a portion of the heavy metals as oxides and/or hydroxides which are precipitated on the surfaces of the carrier-neutralizing agents and the quantity of heavy metals dissolved in the wastewater is reduced to below environmental discharge criteria,*
  *(d) passing the aqueous mixture formed in step (c) to a thickener,*
  *(e) allowing the aqueous mixture to remain in the thickener for a time sufficient to allow the carrier-neutralizing agents coated with the precipitated oxides and/or hydroxides to settle to the bottom of the thickener whereby a sludge containing at least 10 weight percent solids is formed,*
  *(f) removing the sludge from the bottom of the thickener, and*
  *(g) flowing water containing a quantity of dissolved heavy metals which is below environmental discharge criteria over the top of the thickener.*

*14. The method of claim 1 wherein one of the dissolved heavy metals present in a quantity exceeding the level of environmental discharge criteria is copper.*

15. The method of claim 1 wherein one of the dissolved heavy metals present in a quantity exceeding the level of environmental discharge criteria is nickel.

16. The method of claim 1 wherein one of the dissolved heavy metals present in a quantity exceeding the level of environmental discharge criteria is tin.

17. The method of claim 1 wherein one of the dissolved heavy metals present in a quantity exceeding the level of environmental discharge criteria is lead.

18. The method of claim 1 wherein one of the dissolved heavy metals present in a quantity exceeding the level of environmental discharge criteria is cadmium.

19. The method of claim 1 wherein one of the dissolved heavy metals present in a quantity exceeding the level of environmental discharge criteria is mercury.

20. The method of claim 1 wherein one of the dissolved heavy metals present in a quantity exceeding the level of environmental discharge criteria is selenium.

21. The method of claim 1 wherein one of the dissolved heavy metals present in a quantity exceeding the level of environmental discharge criteria is arsenic.

22. An improved method for treating acidic wastewater which contains a quantity of dissolved heavy metals exceeding the level of environmental discharge criteria and having a pH between about 2.5 and 5.0 whereby such quantity of dissolved heavy metals is reduced to a level below environmental discharge criteria and the resolvation of the heavy metals in the acidic wastewater is reduced to a minimum, comprising:

(a) mixing particles of a carrier agent which is sand and an aqueous mixture of at least one neutralizing agent taken from the group consisting of sodium hydroxide, potassium hydroxide, calcium carbonate, sodium carbonate, limestone, calcium oxide and dolomitic limestone in a first reactor for a time sufficient to allow the neutralizing agent to be adsorbed on the particles of the carrier agent and to form an aqueous suspension of the carrier-neutralizing agents, (b) charging the acidic wastewater and a sufficient amount of the aqueous suspension of the carrier-neutralizing agents formed in step (a) into a second reactor wherein the pH of the acidic wastewater is adjusted to between about 8.4 and 10.6, (c) mixing the acidic wastewater and the aqueous suspension of the carrier-neutralizing agents formed in step (a) in the second reactor for a time to precipitate a portion of the heavy metals as oxides and/or hydroxides which are precipitated on the surfaces of the carrier-neutralizing agents and the quantity of heavy metals dissolved in the wastewater is reduced to below environmental discharge criteria, (d) passing the aqueous mixture formed in step (c) to a thickener, (e) allowing the aqueous mixture to remain in the thickener for a time sufficient to allow the carrier-neutralizing agents coated with the precipitated oxides and/or hydroxidees to settle to the bottom of the thickener whereby a sludge containing at least 10 weight percent solids is formed, (f) removing the sludge from the bottom of the thickener, and (g) flowing water containing a quantity of dissolved heavy metals which is below environmental discharge criteria over the top of the thickener.

23. The method of claim 22, wherein the acidic wastewater to be treated also contains dissolved salts which are precipitated as insoluble calcium compounds.

24. The method of claim 1 further comprising the step of passing the aqueous mixture formed in step (c) to a flocculator before passing the aqueous mixture to the thickener and wherein the carrier agent is sludge formed in the method and the neutralizing agent is calcium hydroxide.

25. The method according to any one of claims 1 and 24 wherein the sludge formed in step (e) contains as much as 50 weight percent solids.

26. The method according to any one of claims 1 and 24 wherein the acidic wastewater additionally contains ferrous iron and wherein said method comprises the additional step of removing substantially all of said ferrous iron by precipitation and wherein said removal can be accomplished without oxidation.

27. The method according to any one of claims 1 and 24 wherein the time to precipitate a portion of the heavy metals as oxides and/or hydroxides is between 3 to 10 minutes.

* * * * *

REEXAMINATION CERTIFICATE (3244th)
United States Patent [19]
Herman et al.

[11] B2 4,465,597
[45] Certificate Issued Jul. 1, 1997

[54] TREATMENT OF INDUSTRIAL WASTEWATERS

[75] Inventors: Stewart T. Herman, Hellertown; James B. Pfeiffer, Bethlehem; Richard T. Sewald, Sr., Bethlehem; Charles J. Sterner, Bethlehem, all of Pa.

[73] Assignee: Tetra Technologies, Inc., The Woodlands, Tex.

Reexamination Request:
No. 90/004,094, Jan. 11, 1996

Reexamination Certificate for:
Patent No.: 4,465,597
Issued: Aug. 14, 1984
Appl. No.: 291,439
Filed: Aug. 10, 1981

Reexamination Certificate B1 4,465,597 issued Apr. 25, 1995

[51] Int. Cl.$^6$ ........................................ C02F 1/62
[52] U.S. Cl. .................. 210/713; 210/714; 210/724; 210/912
[58] Field of Search ............................. 210/713, 714, 210/724, 738, 912

[56] References Cited

U.S. PATENT DOCUMENTS

3,738,932  6/1973  Kostenbader ........................... 210/46

OTHER PUBLICATIONS

P. D. Kostenbader, et al., "High Density Sludge Treats Acid Mine Drainage", *Coal Age*, Sep. 1970, pp. 90–97.

J. H. Smith, III, "The Advantage of a Crowd for Acid Waste Liquors," *Mining Engineering*, Dec. 1972, pp. 57–59.

J. L. Boyd, et al., "Heavy Metal Removal for Waste Reuse and Effluent Treatment," *Society of Mining Engineerings of AIME Annual Meeting*, New York, Feb. 19–20, 1975.

Primary Examiner—Thomas Wyse

[57] ABSTRACT

An industrial wastewater treatment method is described whereby heavy metals dissolved in the wastewater are precipitated as a slurry which, when allowed to settle, will form a sludge containing at least 10 weight percent solids. In the method, an aqueous suspension or solution of a neutralizing agent is introduced into a first reactor. A suspension containing particles of carrier agent is also introduced into the first reactor. A portion, if not all, of the neutralizing agent is adsorbed on the surface of the particles of the carrier, which are maintained in suspension in the first reactor. The carrier, with its adsorbed neutralizing agent, is passed to a second reactor and simultaneously the contaminated industrial wastewater is added to the second reactor. The pH of the wastewater is adjusted to a range between 8.4 and 10.6 by the neutralizing agent. Within such pH range, a substantial portion, if not all, of the heavy metals are precipitated in the form of a slurry. The mixture in the second reactor is passed to a solids separation device. The solids in the slurry settle to the bottom of the device to form a sludge which is removed therefrom. Purified water is removed as an overflow from the separation device. Optionally, a flocculant may be added to aid in settling the solids.

Insoluble calcium salts may also be precipitated in the second reactor. Such insoluble salts are adsorbed on the surface of the carrier and/or the heavy metal slurry particles and become part of the sludge formed in the separation device.

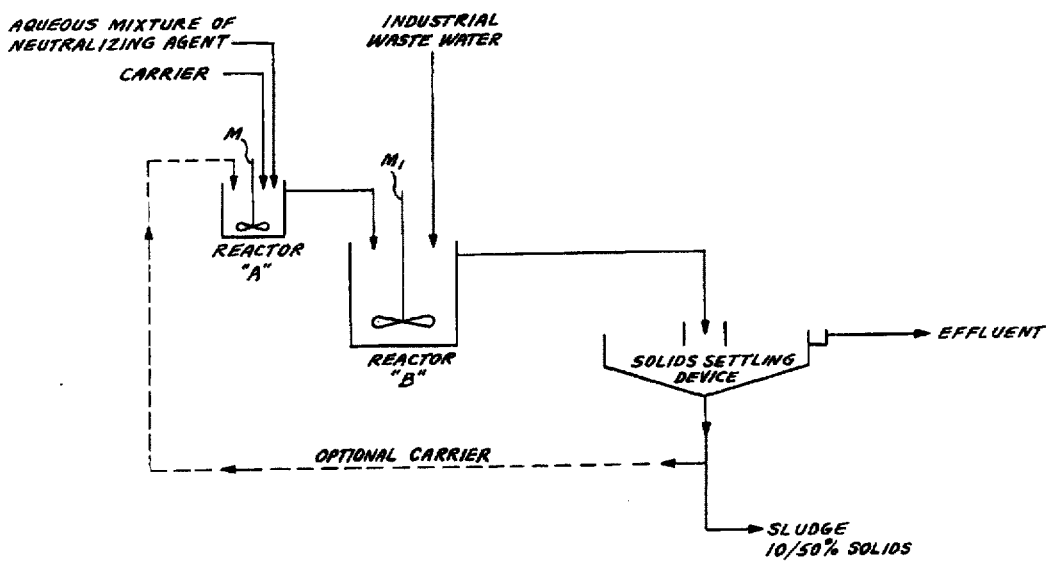

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 6–8, 14–16, 20–23 and 26 is confirmed.

Claim 3 was previously cancelled.

Claims 1, 12, 13, 17–19, 24, 25 and 27 are cancelled.

Claims 4, 5, 9, 10 and 11 are determined to be patentable as amended.

4. The improved method for treating acidic wastewater according to [any one of claims 1 and] *claim 2* wherein the carrier is sludge.

5. The improved method for treating acidic wastewater according to [any one of claims 1 and] *claim 2* wherein the neutralizing agent is an aqueous suspension of calcium hydroxide.

9. The improved method for treating acidic wastewater according to [any one of claims 1 and] *claim 2* wherein the aqueous suspension of the carrier-neutralizing agents formed in step (a) and the acidic wastewater remain in the second reactor for at least one minute in step (c).

10. The improved method for treating acidic wastewater according to [any one of claims 1 and] *claim 2* wherein the sludge formd in step (e) contains between 10 and 50 weight percent solids.

11. The improved method for treating acidic wastewater according to [any one of claims 1 and] *claim 2* wherein a flocculant is added to the aqueous mixture in step (e).

* * * * *